United States Patent
Shinomiya (10) Patent No.: US 9,807,320 B2
(45) Date of Patent: Oct. 31, 2017

(54) OPERATION INPUT DEVICE, OPERATION INPUT METHOD, AND COMPUTER-READABLE RECORDING MEDIUM

(71) Applicant: JVC KENWOOD Corporation, Yokohama-shi, Kanagawa (JP)

(72) Inventor: Teruhiko Shinomiya, Yokohama (JP)

(73) Assignee: JVC KENWOOD Corporation, Kanagawa (JP)

( * ) Notice: Subject to any disclaimer, the term of this patent is extended or adjusted under 35 U.S.C. 154(b) by 0 days.

(21) Appl. No.: 15/040,061

(22) Filed: Feb. 10, 2016

(65) Prior Publication Data
US 2016/0165154 A1    Jun. 9, 2016

Related U.S. Application Data

(63) Continuation of application No. PCT/JP2014/067986, filed on Jul. 4, 2014.

(30) Foreign Application Priority Data

Sep. 27, 2013  (JP) .................. 2013-202507
Jan. 29, 2014  (JP) .................. 2014-014753

(51) Int. Cl.
*H04N 5/33*     (2006.01)
*G06K 9/46*    (2006.01)
(Continued)

(52) U.S. Cl.
CPC .............. *H04N 5/33* (2013.01); *G06F 3/017* (2013.01); *G06F 3/0304* (2013.01);
(Continued)

(58) Field of Classification Search
CPC ....................................................... H04N 5/33
(Continued)

(56) References Cited

U.S. PATENT DOCUMENTS 8,378,970 B2   2/2013  Nishida et al.
8,681,099 B2   3/2014  Nishida et al.
(Continued)

FOREIGN PATENT DOCUMENTS

JP   2009-104297   5/2009
JP   2009-230287   10/2009
(Continued)

OTHER PUBLICATIONS

International Search Report for International Patent Application No. PCT/JP2014/067986 dated Aug. 5, 2014, 4 pages.
(Continued)

*Primary Examiner* — Christopher S Kelley
*Assistant Examiner* — Jonathan Messmore
(74) *Attorney, Agent, or Firm* — Amin, Turocy & Watson LLP (57) ABSTRACT

An operation input device includes an infrared irradiation unit radiates infrared, a capturing unit detects the infrared to capture an image, an luminance calculating unit calculates, in a captured image, a luminance difference between a luminance of a first area irradiated with the infrared by the infrared irradiation unit and a luminance of a second area arranged outside the first area, an infrared control unit adjusts an irradiation intensity of the infrared to be radiated from the infrared irradiation unit so that the luminance difference calculated by the luminance calculating unit becomes a predetermined target value, an image processing unit detects a shape of an indication object from the captured image, a determination unit determines an operation by the indication object from the shape detected by the image processing unit, and a command unit makes a device to be operated perform a function corresponding to the determined operation determined.

14 Claims, 6 Drawing Sheets

(51) Int. Cl.
    *H04N 5/235*     (2006.01)
    *H04N 5/225*     (2006.01)
    *G06F 3/01*     (2006.01)
    *G06F 3/03*     (2006.01)
    *G06K 9/00*     (2006.01)

(52) U.S. Cl.
    CPC ....... *G06K 9/00845* (2013.01); *G06K 9/4661* (2013.01); *H04N 5/2256* (2013.01); *H04N 5/2354* (2013.01); *G06K 2009/4666* (2013.01)

(58) Field of Classification Search
    USPC .......................................................... 348/164
    See application file for complete search history.

(56) References Cited

U.S. PATENT DOCUMENTS

| | | | |
|---|---|---|---|
| 2004/0196371 A1* | 10/2004 | Kono | .................. H04N 5/2251 348/162 |
| 2007/0052840 A1 | 3/2007 | Okuno | |
| 2008/0013793 A1* | 1/2008 | Hillis | ................... G03H 1/0005 382/114 |
| 2013/0241888 A1 | 9/2013 | Sharma | |
| 2014/0092215 A1* | 4/2014 | Hayama | ............. A61B 1/00009 348/45 |
| 2014/0380252 A1 | 12/2014 | Tanaka et al. | |

FOREIGN PATENT DOCUMENTS

| | | |
|---|---|---|
| JP | 2011-100214 | 5/2011 |
| JP | 2013-152711 | 8/2013 |

OTHER PUBLICATIONS

Written Opinion for International Patent Application No. PCT/JP2014/067986 dated Aug. 5, 2014, 3 pages.
Written Opinion for International Patent Application No. PCT/JP2014/067986 dated Aug. 5, 2014, 4 pages.
Extended European Search Report for European Patent Application No. 14848824.0 dated Oct. 20, 2016, 9 pages.

* cited by examiner

OPERATION INPUT DEVICE, OPERATION INPUT METHOD, AND COMPUTER-READABLE RECORDING MEDIUM

CROSS-REFERENCE TO RELATED APPLICATIONS

This application is a continuation of PCT international application Ser. No. PCT/JP2014/067986 filed on Jul. 4, 2014 which designates the United States, incorporated herein by reference, and which claims the benefit of priority from Japanese Patent Application No. 2014-014753, filed on Jan. 29, 2014, and Japanese Patent Application No. 2013-202507, filed on Sep. 27, 2013, incorporated herein by reference.

BACKGROUND OF THE INVENTION

1. Field of the Invention

The present invention relates to an operation input device, an operation input method, and a computer-readable recording medium.

2. Description of the Related Art

In recent years, a lot of devices such as a car navigation device, an audio system, and an air conditioner have been mounted on an automobile. Generally, a driver operates such devices by pressing a button, which is accompanied by a movement of the driver's eye gaze. Therefore, if the device is operated by the driver who operates the button while driving the automobile, the driver might inadvertently look away from the front. Thus, the driver preferably can operate the device while keeping looking forward.

A device for operating an in-vehicle device has been proposed as an operation input device enabling the driver to operate the device while keeping looking forward as mentioned above. Specifically, the device is configured to capture a shape and a movement of a driver's hand (hereinafter referred to as gesture), and to identify the gesture so as to operate the in-vehicle device (refer to Japanese Laid-open Patent Publication No. 2009-104297). The operation input device described in Patent Literature 1 is configured to mainly use a visible light camera in the daytime and an infrared camera at night as a camera for capturing and identifying the gesture.

However, the operation input device described in Japanese Laid-open Patent Publication No. 2009-104297 has had a problem that when using the infrared camera, gesture detection accuracy is influenced and deteriorated by a disturbance of sunlight in the daytime. In addition, in a case where the infrared camera is used at night and the visible light camera is used in the daytime, another problem, namely a cost increase, has been caused by a need for two cameras.

Therefore, there is a need for an operation input device, an operation input method, and a computer-readable recording medium for suppressing the influence of the disturbance and improving the gesture detection accuracy.

SUMMARY OF THE INVENTION

It is an object of the present invention to at least partially solve the problems in the conventional technology.

In order to solve above-mentioned problems and achieve an object, the present invention provides an operation input device that includes an infrared irradiation unit configured to radiate infrared, a capturing unit configured to detect the infrared to capture an image, a luminance calculating unit configured to calculate, in a captured image which is the image captured by the capturing unit, a luminance difference between a luminance of a first area irradiated with the infrared by the infrared irradiation unit and a luminance of a second area arranged outside the first area, an infrared control unit configured to adjust an irradiation intensity of the infrared to be radiated from the infrared irradiation unit so that the luminance difference calculated by the luminance calculating unit becomes a predetermined target value, an image processing unit configured to detect a shape of an indication object from the captured image, a determination unit configured to determine an operation by the indication object from the shape detected by the image processing unit, and a command unit configured to make a device to be operated perform a function corresponding to the operation determined by the determination unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of an operation input device, an operation input method, and a computer-readable recording medium according to the present invention will be described in detail referring to the accompanying drawings. The present invention is not limited by the following embodiments, and components of the following embodiments include what can be easily conceived by a person skilled in the art, what is substantially identical, and what is within a so-called scope of equivalence. Furthermore, the components can be variously omitted, substituted, and changed in a range not deviating from the gist of the following embodiments.

First Embodiment

Configuration of Operation Input System

Figure 1:
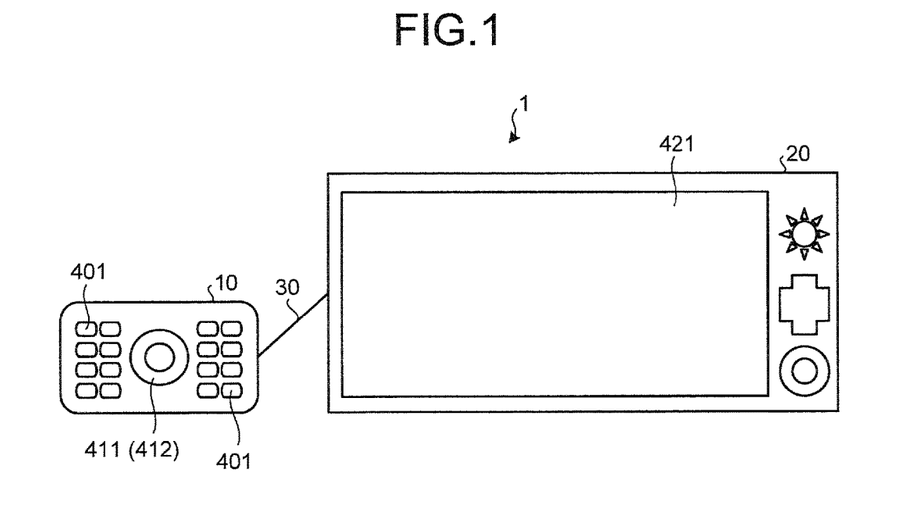
FIG. 1 is a view illustrating an exemplary overall configuration of an operation input system according to a first embodiment.

FIG. 1 is a view illustrating an exemplary overall configuration of an operation input system according to a first embodiment. An overall configuration of an operation input system 1 according to the present embodiment will be described referring to FIG. 1. The following description will refer to an example in which the operation input system 1 illustrated in FIG. 1 is mounted on an automobile. However, the vehicle is not limited to the automobile, and the operation input system 1 may also be mounted on, for example, a train or an airplane.

The operation input system 1 illustrated in FIG. 1 is a system for recognizing a gesture of a driver and operating a device to be operated in accordance with an operation command corresponding to the gesture. The operation input system 1 includes an input controller 10 (operation input device) and a car navigation device 20 coupled to each other by a communication cable 30.

The input controller 10 is a device for recognizing the gesture of the driver and generating the operation command corresponding to the gesture so as to transmit the operation command to the car navigation device 20 via the communication cable 30. The input controller 10 includes a plurality of infrared LEDs 401, a camera 411, and an infrared transmission filter 412. The plurality of infrared LEDs 401 radiates infrared. The camera 411 captures an image within a predetermined angle of view. The infrared transmission filter 412 is attached to an incident side of an optical system of the camera 411 for transmitting only the infrared. In addition, the input controller 10 is installed in such a capturing direction as to prevent windows of the automobile from appearing in the image to be captured. For example, the input controller 10 is preferably installed on a dashboard of the automobile in a capturing direction obliquely upward from the dashboard toward a roof of the automobile. This can suppress a reduction in gesture detection accuracy due to a disturbance of, for example, sunlight entering through the windows of the automobile, in gesture operation recognition processing which will be described later.

The camera 411 may be, for example, a camera for detecting general visible light, but should be a camera also capable of detecting at least the infrared. The camera 411 includes the optical system and a solid-state image sensor (image sensor). The optical system includes, for example, lenses which are not illustrated in the drawing. The solid-state image sensor generates the image by converting, to an electrical signal, the infrared that has entered the optical system through the infrared transmission filter 412. The solid-state image sensor is realized, for example, by a charge coupled device (CCD) sensor or a complementary metal oxide semiconductor (CMOS) sensor.

As mentioned above, by using the camera 411 capable of detecting at least the infrared, and the infrared transmission filter 412, a cost can be reduced compared to a case using an infrared camera that detects only the infrared with a high accuracy.

In FIG. 1, the plurality of infrared LEDs 401 is arranged so as to surround the camera 411. However, an arrangement configuration of the plurality of infrared LEDs 401 is not limited to the arrangement configuration illustrated in FIG. 1. In addition, the infrared LEDs 401 may be a single infrared LED instead of the plurality of infrared LEDs.

The car navigation device 20 is an exemplary device to be operated by the input controller 10. For example, the car navigation device 20 is a device for displaying a current location of a vehicle such as the automobile on which the car navigation device 20 is mounted, or a route guidance to a destination. The car navigation device 20 performs, in accordance with the operation command generated by the input controller 10 and received via the communication cable 30, a function corresponding to the operation command. The car navigation device 20 includes a display screen 421 for displaying, for example, the current location of the vehicle such as the automobile, and the route guidance to the destination.

The communication cable 30 is a cable conforming to communication standards of the input controller 10 and the car navigation device 20. The communication cable 30 includes, for example, a USE cable or an Ethernet (registered trademark) cable. Communication between the input controller 10 and the car navigation device 20 is not limited to wired communication by means of the communication cable 30, and may be wireless communication by means of standards such as wireless fidelity (WiFi) and Bluetooth (registered trademark).

The car navigation device 20 is illustrated in FIG. 1 as an example of the device to be operated. However, the device is not limited to the car navigation device 20, and may be an audio system, an air conditioner, or any other in-vehicle device.

The input controller 10 and the car navigation device 20 as the device to be operated are configured separately in FIG. 1. However, the input controller 10 and the car navigation device 20 are not limited to this configuration, and may be configured integrally. In this case, when the car navigation device 20 is installed on the dashboard, the camera 411 is preferably positioned in the capturing direction obliquely upward from the dashboard toward the roof of the automobile.

Block Configuration of Input Controller

Figure 2:
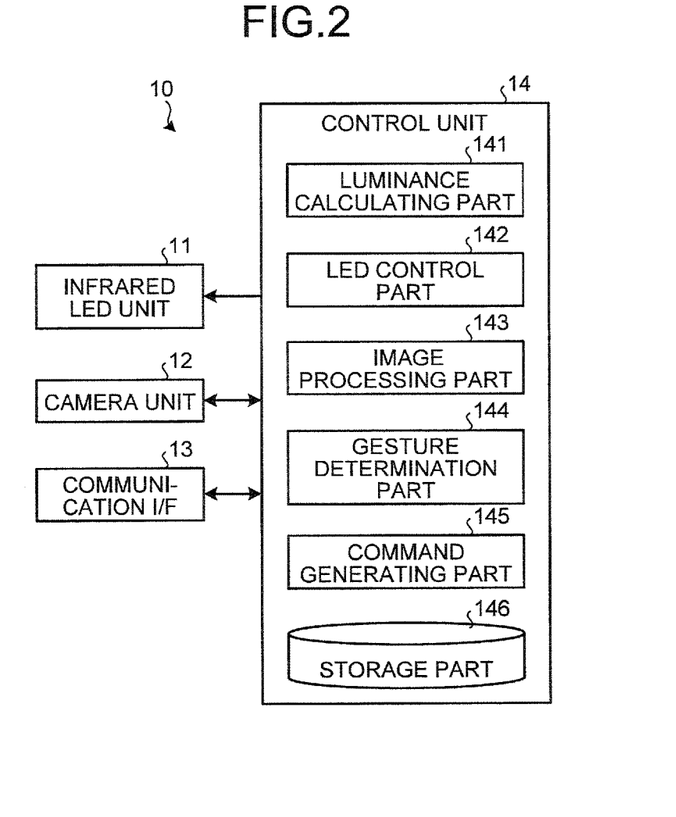
FIG. 2 is a diagram illustrating an exemplary block configuration of an input controller according to the first embodiment.

FIG. 2 is a diagram illustrating an exemplary block configuration of the input controller according to the first embodiment. A block configuration of the input controller 10 according to the present embodiment will be described referring to FIG. 2.

As illustrated in FIG. 2, the input controller 10 includes an infrared LED unit 11 (infrared irradiation means), a camera unit 12 (capturing means), a communication interface (I/F) 13, and a control unit 14.

The infrared LED unit 11 including the infrared LEDs 401 illustrated in FIG. 1 is a unit for radiating the infrared in accordance with a command from an LED control part 142, which will be described later.

The camera unit 12 is a unit for capturing the image and transmitting the captured image to the control unit 14. The camera unit 12 is realized by the camera 411 equipped with the infrared transmission filter 412 illustrated in FIG. 1.

The communication interface 13 is an interface conforming to the communication standard of the car navigation device 20 to be operated. The communication interface 13 includes, for example, a USB interface or an Ethernet interface.

The control unit 14 is in charge of entire control of the input controller 10. The control unit 14 specifically controls: adjustment of an intensity of the infrared to be radiated from the infrared LED unit 11; various types of processing to the image captured by the camera unit 12; determination of the gesture of the driver based on the captured image; and transmission of the operation command corresponding to the determined gesture to the car navigation device 20. The control unit 14 has a luminance calculating part 141 (luminance calculating means), the LED control part 142 (infrared control means), an image processing part 143 (image processing means), a gesture determination part 144 (determination means), a command generating part 145 (command means), and a storage part 146 (storage means).

The luminance calculating part 141 calculates a luminance average of an area corresponding to an irradiated region irradiated with the infrared from the infrared LED unit 11 in the image captured by the camera unit 12. The luminance calculating part 141 also calculates a luminance average of a predetermined area outside the irradiated region in the image captured by the camera unit 12. The luminance calculating part 141 calculates a luminance difference between the luminance average of the area corresponding to the irradiated region and the luminance average of the predetermined area outside the irradiated region.

The LED control part 142 controls the intensity of the infrared to be radiated from the infrared LED unit 11.

The image processing part 143 binarizes the image captured by the camera unit 12, and determines whether the gesture of the driver's hand is included in the binarized image.

The gesture determination part 144 determines what kind of gesture has been detected by the image processing part 143. The gesture is not limited to that of the driver's hand, and may be of an indication object (including the hand) for indicating the operation extensively.

The command generating part 145 generates, for the car navigation device 20 to be operated, the operation command which corresponds to the gesture determined by the gesture determination part 144.

When the infrared to be radiated is controlled by the LED control part 142 to have a predetermined intensity, the storage part 146 stores a luminance maximum value of the area corresponding to the irradiated region irradiated with the infrared in the image captured by the camera unit 12. The storage part 146 is realized by a rewritable volatile or non-volatile storage device such as a random access memory (RAM) or a solid state drive (SSD).

The luminance calculating part 141, the LED control part 142, the image processing part 143, the gesture determination part 144, and the command generating part 145 are functions or means which are realized by a program stored in, for example, a read only memory (ROM) (not illustrated) and executed by, for example, a central processing unit (CPU). A part or all of the luminance calculating part 141, the LED control part 142, the image processing part 143, the gesture determination part 144, and the command generating part 145 may be realized by a hardware circuit, not by a program which is software. The luminance calculating part 141, the LED control part 142, the image processing part 143, the gesture determination part 144, and the command generating part 145 are schematic configurations of their functions, and not limited to such configurations.

Operation of Luminance Adjustment Processing

Figure 3:
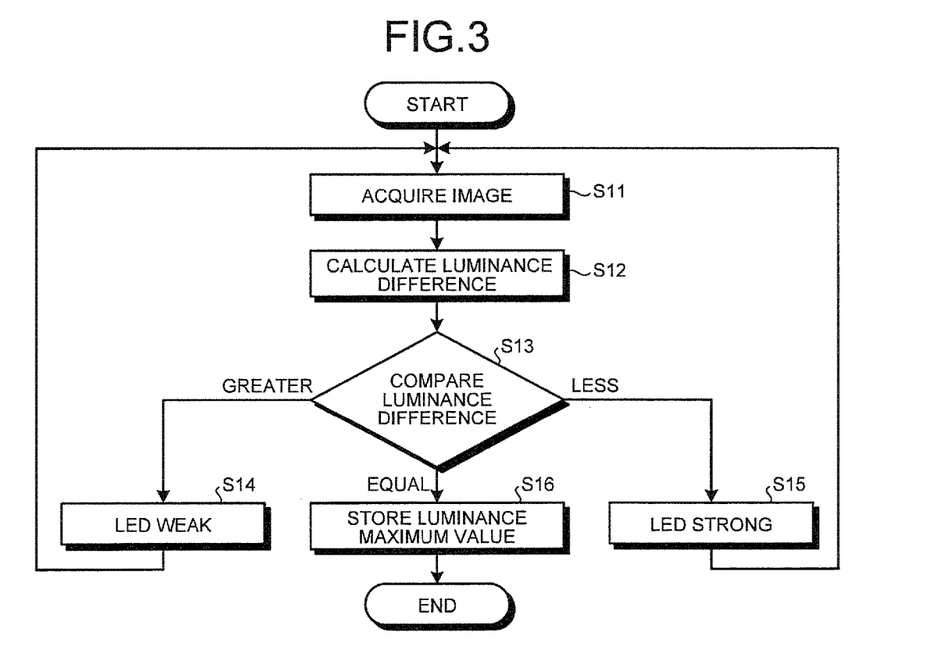
FIG. 3 is a flowchart illustrating an exemplary operation of luminance adjustment processing for infrared LEDs in the input controller according to the first embodiment.
Figure 4:
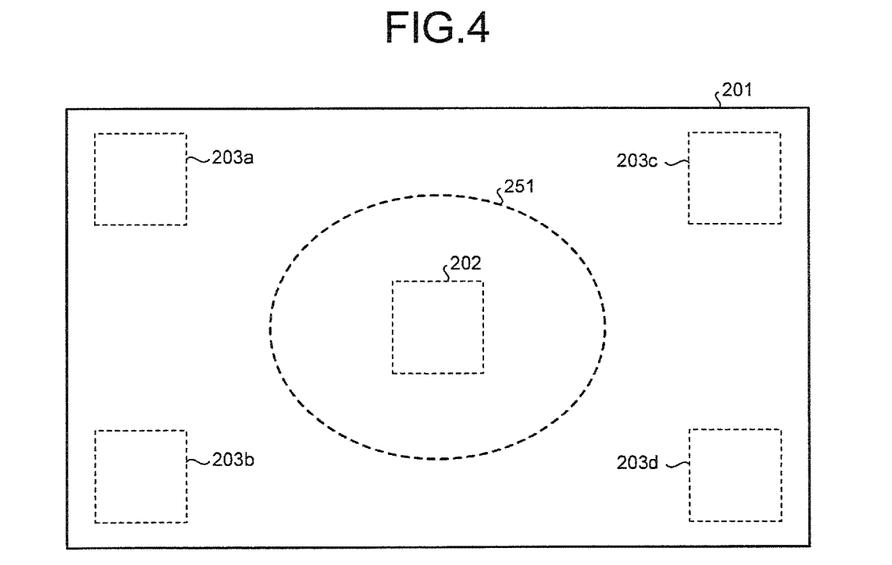
FIG. 4 is a view illustrating an exemplary image captured by a camera unit and exemplary sample areas according to the first embodiment.

FIG. 3 is a flowchart illustrating an exemplary operation of luminance adjustment processing for the infrared LEDs in the input controller according to the first embodiment. FIG. 4 is a view illustrating an exemplary image captured by the camera unit and exemplary sample areas according to the first embodiment. The luminance adjustment processing for the infrared to be radiated from the infrared LED unit 11 in the input controller 10 according to the present embodiment will be described referring to FIGS. 3 and 4.

Step S11

The LED control part 142 of the control unit 14 makes the infrared LED unit 11 radiate the infrared of a predetermined intensity over a somewhat wide range. The camera unit 12 captures the image in the capturing direction toward the roof of the automobile, and transmits the image to the luminance calculating part 141 of the control unit 14. Some of the infrared radiated from the infrared LED unit 11 is reflected from, for example, the roof of the automobile, and then passes through the infrared transmission filter 412. The image thus captured by the camera unit 12 is a black-and-white image. Then, the process proceeds to step S12.

Step S12

The luminance calculating part 141 calculates a luminance average (hereinafter referred to as irradiated part luminance average) of an irradiated region sample area 202 (first area) in a captured image 201 which is a received image illustrated in FIG. 4. The irradiated region sample area 202 is a predetermined area included in an irradiated region 251 which is an area of the infrared radiated from the infrared LED unit 11 to the roof. In addition, the luminance calculating part 141 calculates luminance averages of respective peripheral part sample areas 203a to 203d (second area) which are predetermined areas outside the irradiated region 251 in the captured image 201. The luminance calculating part 141 extracts a maximum average (hereinafter referred to as peripheral part luminance maximum average) from the luminance averages calculated in the respective peripheral part sample areas 203a to 203d. In this case, the luminance is high in the irradiated region sample area 202, which is within the irradiated region 251 and irradiated with the infrared. On the other hand, the luminance is low in the peripheral part sample areas 203a to 203d, which are outside the irradiated region 251 and not irradiated with the infrared. Then, the luminance calculating part 141 calculates a luminance difference, which is a difference between the irradiated part luminance average and the peripheral part luminance maximum average. Then, the process proceeds to step S13.

The luminance averages are calculated in a plurality of sample areas such as the peripheral part sample areas 203a to 203d illustrated in FIG. 4, whereby the peripheral part luminance maximum average can be calculated with a lot of luminance information in the area outside the irradiated region 251 included. Therefore, the luminance calculating part 141 can accurately calculate the luminance difference, which is the difference between the irradiated part luminance average and the peripheral part luminance maximum average.

A single irradiated region sample area 202 and four peripheral part sample areas 203a to 203d are illustrated in FIG. 4. However, the number of sample areas is not limited to this example, and a different number of sample areas may be provided. Although the peripheral part sample areas 203a to 203d illustrated in FIG. 4 are arranged at four corners of the captured image 201, they are not limited to this arrangement, and may be arranged in any area outside the irradiated region 251. However, in a case where a window part of the automobile is included in the captured image 201, the peripheral part sample areas 203a to 203d are preferably provided at positions avoiding the window part in order to reduce an influence on the luminance of the infrared due to the sunlight.

Step S13

The LED control part 142 compares the luminance difference with a predetermined target value. As the result of the comparison by the LED control part 142 between the luminance difference and the target value, if the luminance difference is greater than the target value (step S13: GREATER), the process proceeds to step S14. If the luminance difference is less than the target value (step S13: LESS), the process proceeds to step S15. If the luminance difference is equal to the target value (step S13: EQUAL), the process proceeds to step S16.

The LED control part 142 performs the comparison between the luminance difference and the predetermined target value. In this regard, a determination as to whether the luminance difference is the predetermined target value is a concept including a determination as to whether the luminance difference is within a predetermined target range. In this case, if the luminance difference is greater than the predetermined target range, the process may proceed to step S14. If the luminance difference is less than the predetermined target range, the process may proceed to step S15. If the luminance difference is within the predetermined target range, the process may proceed to step S16.

Step S14

The LED control part 142 reduces the intensity of the infrared radiated from the infrared LED unit 11 by a predetermined amount. Then, the process returns to step S11, where the camera unit 12 captures the image again.

Step S15

The LED control part 142 increases the intensity of the infrared radiated from the infrared LED unit 11 by a predetermined amount. Then, the process returns to step S11, where the camera unit 12 captures the image again.

As described above, by repeating the operations of step S14 and step S15, the intensity of the infrared to be radiated from the infrared LED unit 11 is adjusted so that the luminance difference matches the predetermined target value.

Step S16

In a case where the luminance difference is equal to the predetermined target value, the LED control part 142 maintains the current irradiation intensity of the infrared radiated from the infrared LED unit 11. The luminance calculating part 141 then obtains the luminance maximum value of the irradiated region sample area 202, and stores the luminance maximum value in the storage part 146.

The luminance adjustment processing is performed as described above. The luminance adjustment processing is only required to be performed as an initial operation when starting the operation input system 1, and after that performed every predetermined time.

Gesture Operation Recognition Processing

Figure 5:
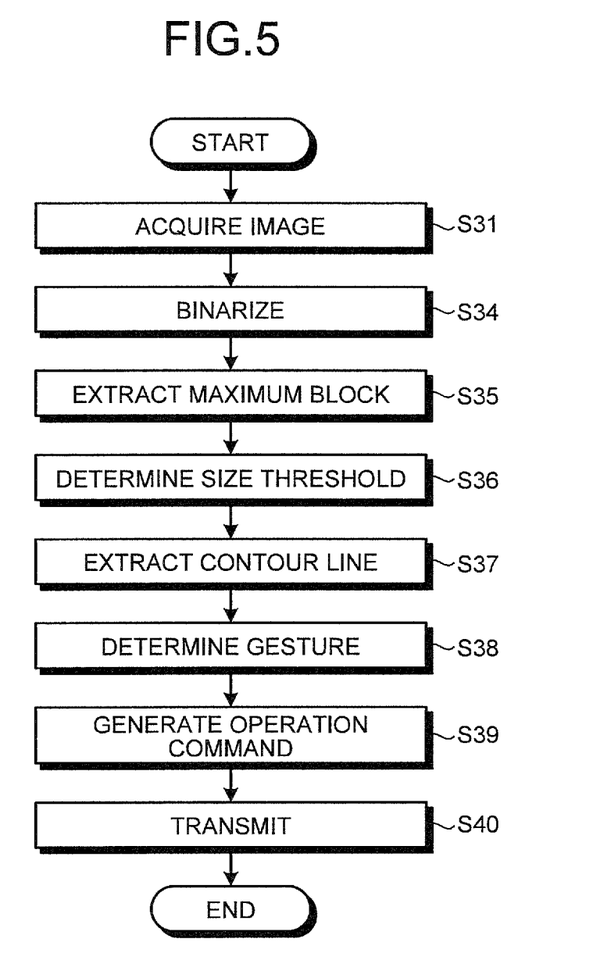
FIG. 5 is a flowchart illustrating an exemplary operation of gesture operation recognition processing in the input controller according to the first embodiment.
Figure 6:
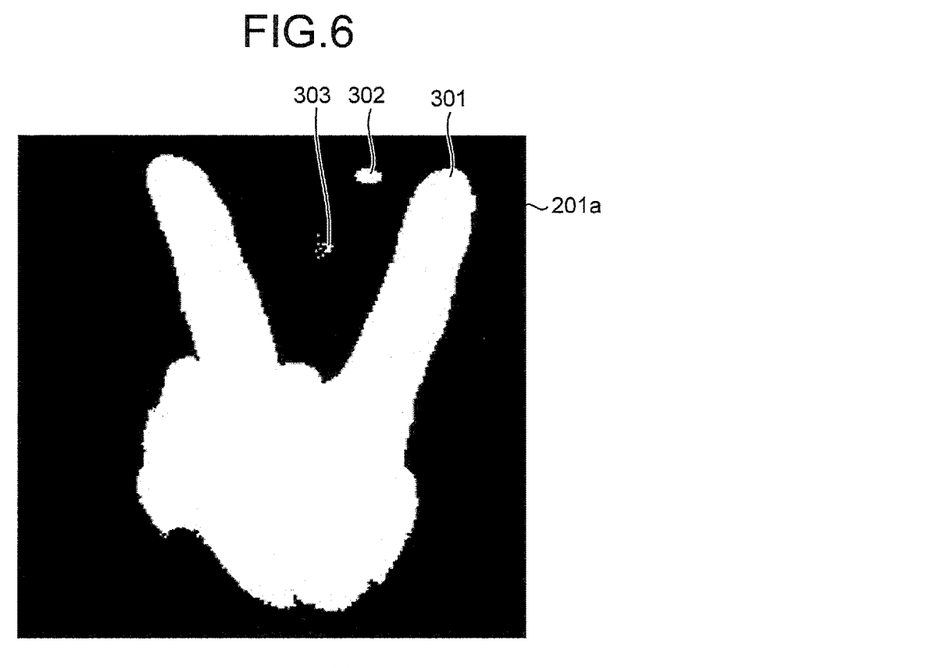
FIG. 6 is a view illustrating an exemplary binary image of the image captured by the input controller according to the first embodiment.
Figure 7:
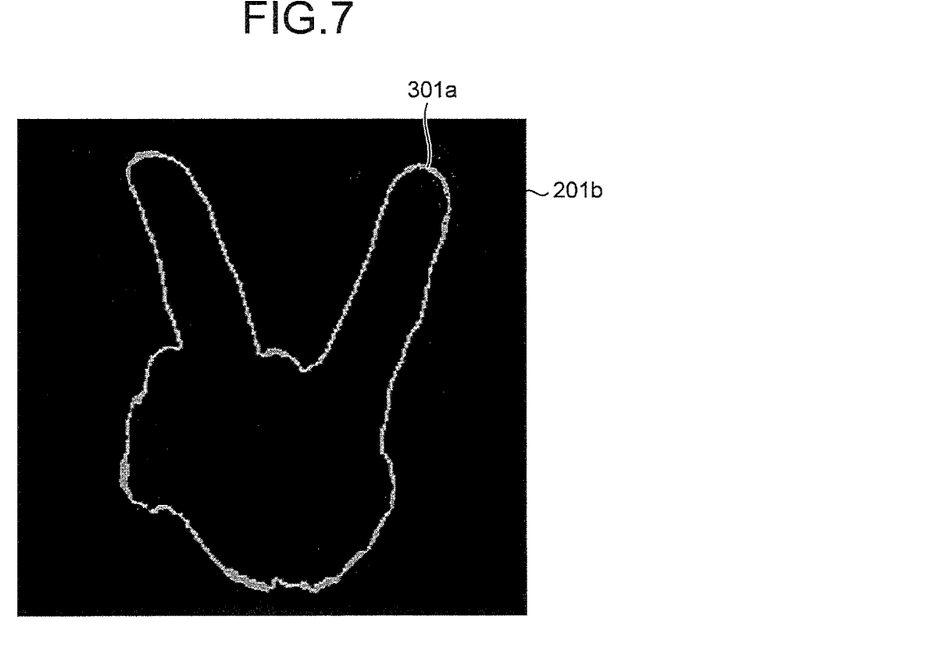
FIG. 7 is a view illustrating a contour extraction image obtained by performing distance conversion and contour extraction on the binary image of the image captured by the input controller according to the first embodiment.

FIG. 5 is a flowchart illustrating an exemplary operation of the gesture operation recognition processing in the input controller according to the first embodiment. FIG. 6 is a view illustrating an exemplary binary image of the image captured by the input controller according to the first embodiment. FIG. 7 is a view illustrating a contour extraction image obtained by performing distance conversion and contour extraction on the binary image of the image captured by the input controller according to the first embodiment. The gesture operation recognition processing in the input controller 10 according to the present embodiment will be described referring to FIGS. 5 to 7.

Step S31

The camera unit 12 captures the image in the capturing direction toward the roof of the automobile, and transmits the image to the luminance calculating part 141 of the control unit 14. Then, the process proceeds to step S34.

Step S34

The luminance calculating part 141 compares pixel values of pixels constituting the received image with the luminance maximum value stored in the storage part 146 so as to binarize the image and generate a binary image 201a illustrated in FIG. 6. For example, when each of the pixel values of the pixels constituting the received image is greater than the luminance maximum value, the luminance calculating part 141 converts each of the pixels to a pixel with a value "1". When each of the pixel values of the pixels constituting the received image is equal to or less than the luminance maximum value, the luminance calculating part 141 converts each of the pixels to a pixel with a value "0". The binary image 201a is thus generated. Then, the process proceeds to step S35.

Step S35

The binary image 201a illustrated in FIG. 6 is an example of the binarized captured image, and has blocks 301 to 303 as blocks of pixels with the pixel value "1". When the driver holds his/her hand in front of the camera unit 12 of the input controller 10, the hand is exposed to the infrared radiated from the infrared LEDs 401. The roof of the automobile has been exposed to the infrared radiated from the infrared LEDs 401 before the driver holds his/her hand. By holding the hand, however, the infrared is reflected at the position of the hand, which is at a shorter distance than the distance to the roof, thereby entering the camera unit 12. Therefore, the luminance of the hand region in the image captured by the camera unit 12 while holding the hand is higher than the luminance of a section corresponding to the roof in the image captured by the camera unit 12 without holding the hand. Thus, when the image captured by the camera unit 12 is binarized, the pixel values of the pixels in the hand region are converted to "1", and the pixel values of the pixels in a section outside the hand region are converted to "0".

However, small noises may be generated by binarizing the captured image in the above-described way. Therefore, a filter for removing the noises is preferably applied. In order to remove the noises from the binary image, filtering is performed, for example, by a median filter. In this regard, the median filter is a filter to arrange, in ascending order, pixel values of pixels in an n×n local region in an image to be filtered, and then replace a pixel value of a central pixel in the local region with a middle pixel value in the arranged pixel values. Even after such a filter is arranged to remove the noises, blocks other than the block of the hand region sometimes remain unremoved. Therefore, in a case where a plurality of blocks exists in the binary image 201a, the image processing part 143 calculates sizes of respective blocks to extract the block of the maximum size as a candidate block of the hand region. In FIG. 6, the image processing part 143 extracts, from the blocks 301 to 303, the block 301 having the maximum size as the candidate block of the hand region. Then, the process proceeds to step S36.

Step S36

The image processing part 143 compares, with a predetermined threshold, the size of the block 301 which is the candidate of the hand region in the binary image 201a. If the size of the block 301 is greater than the threshold, the image processing part 143 determines that the block 301 corresponds to the hand region. If the size of the block 301 which is the candidate of the hand region in the binary image 201a is equal to or less than the predetermined threshold, the image processing part 143 determines that the block 301 is not the block of the hand region, and ends the gesture operation recognition processing. On the other hand, if the size of the block 301 which is the candidate of the hand region is greater than the predetermined threshold, the image processing part 143 determines that the block 301 is the block of the hand region. Then, the process proceeds to step S37.

Step S37

The image processing part 143 obtains a contour extraction image 201b including a contour extraction block 301a illustrated in FIG. 7 obtained by extracting a contour line of the block 301 which is determined as the block of the hand region in the binary image 201a. Specifically, the image processing part 143 performs distance conversion processing on the binary image 201a, from which the blocks 302 and 303 other than the block 301 have been erased. The distance conversion processing in this context is processing to replace the pixel values of the pixels with the pixel value "1" in the binary image with distances to the pixels with the pixel value "0" arranged nearest to these pixels. In the image after the distance conversion processing, the pixels with the distance "1" are connected to each other, whereby the contour line of the figure in the image can be obtained. The image thus obtained is the contour extraction image 201b. Furthermore, the image processing part 143 calculates a length of the contour line of the contour extraction block 301a. Then, the process proceeds to step S38.

Step S38

In this step, the gesture determination part 144 determines which gesture, for example, among "rock", "scissors", and "paper", corresponds to the gesture of the driver's hand. If the gesture of the hand is "paper", the contour line is long because the contour line appears in each finger. However, if the gesture of the hand is "rock", the contour line is short because the hand is formed in a substantially oval shape. Regarding a feature quantity, (length of contour line)/(square root of size) is defined. If the figure is as complicated as "paper", the above feature quantity is large. If the figure is as simple as "rock", the feature quantity is small. If the figure is "scissors", the feature quantity is a value between them. Thus, the gesture can be determined among "rock", "scissors", and "paper" by employing this feature quantity. The gesture determination part 144 calculates the above-mentioned feature quantity based on the size of the block 301 and the length of the contour line of the contour extraction block 301a calculated by the image processing part 143. In addition, the gesture determination part 144 determines which gesture, among "rock", "scissors", and "paper", corresponds to the gesture of the hand. Then, the process proceeds to step S39.

In the above description, "rock", "scissors", and "paper" are referred to as examples of the gestures determined by the gesture determination part 144. However, the gestures are not limited to these examples. For example, the gesture determination part 144 may be configured to determine the gestures by detecting the number of raised fingers.

Furthermore, (length of contour line)/(square root of size) is referred to as the feature quantity for the gesture determination by the gesture determination part 144. However, the feature quantity is not limited to this example, and any feature quantity may be used as long as the gesture can be determined.

In addition, the gesture determination part 144 in the above-mentioned example determines static gestures of the driver such as "rock", "scissors", and "paper". However, the gesture determination part 144 may be configured to determine dynamic gestures compared to previous gestures, such as, for example, motions and directions of the driver's hand, and stretching/contracting of the fingers.

Step S39

The command generating part 145 generates, for the car navigation device 20, the operation command which corresponds to the gesture determined by the gesture determination part 144. Then, the process proceeds to step S40.

Step S40

The command generating part 145 transmits the generated operation command to the car navigation device 20 via the communication interface 13 and the communication cable 30. The car navigation device 20 performs, in accordance with the received operation command, a function corresponding to the operation command.

For example, if the gesture determined by the gesture determination part 144 is "paper", the car navigation device 20 changes a map displayed on the display screen 421 to a street map. If the gesture is "scissors", the car navigation device 20 zooms in the map displayed on the display screen 421. If the gesture is "rock", the car navigation device 20 zooms out the map displayed on the display screen 421.

The above-mentioned gesture operation recognition processing shall be performed repeatedly. By performing the above-mentioned gesture operation recognition processing, the car navigation device 20, which is the device to be operated, can be operated by the gesture of the driver.

In a case where some block having the maximum size is extracted by the image processing part 143 in step S35, and the size of the block is equal to or less than the predetermined threshold in the image processing part 143 in step S36, it is highly possible that the driver has tried some gesture operation. In this case, it is also highly possible that the luminance adjustment processing has not been performed appropriately. Thus, when the size of the block is equal to or less than the predetermined threshold in the image processing part 143 in step S36, and the gesture operation recognition processing is ended, the control unit 14 preferably performs the luminance adjustment processing.

As described above, in the image of the infrared captured by the infrared LED unit 11, the irradiation intensity of the infrared to be radiated from the infrared LED unit 11 is adjusted so that the luminance difference, which is the difference between the luminance of the irradiated region sample area 202 and the luminance of the peripheral part sample areas 203a to 203d, becomes the target luminance difference. As a result, the irradiation intensity of the infrared to be radiated is adjusted in response to changes in the environment around the input controller 10. Therefore, the influence of the disturbance on the gesture operation recognition processing can be reduced, and the gesture detection accuracy can be improved. In addition, by using the infrared instead of the visible light, the input controller 10 can be used even at night. In the daytime, since the input controller 10 is not sensitive to the influence of the sunlight as the disturbance, a device reliability of the input controller 10 is improved. Furthermore, the irradiation intensity of the infrared to be radiated from the infrared LED unit 11 is adjusted so that the luminance difference becomes the target luminance difference as described above, whereby an increase in power consumption can be suppressed.

Moreover, the operation input system 1 according to the present embodiment does not need to use two cameras, namely the visible light camera in the daytime and the infrared camera at night. Therefore, a cost increase can be suppressed.

Second Embodiment

An operation input system 1 according to a second embodiment will be described by focusing on differences from the operation input system 1 according to the first embodiment. An overall configuration of the operation input system 1 according to the second embodiment is similar to the overall configuration of the operation input system 1 according to the first embodiment illustrated in FIG. 1.

Block Configuration of Input Controller

Although a block configuration of the input controller 10 according to the second embodiment is similar to the block configuration of the input controller 10 according to the first embodiment illustrated in FIG. 2, different functions of the components will be described.

When the infrared to be radiated is controlled by the LED control part 142 to have a predetermined intensity, the storage part 146 stores the luminance maximum value of the area corresponding to the irradiated region irradiated with the infrared in the image captured by the camera unit 12. The storage part 146 also stores the luminance average in the predetermined area outside the irradiated region. The storage part 146 is realized by the rewritable volatile or non-volatile storage device such as the RAM or the SSD.

Operation of Luminance Adjustment Processing

Figure 8:
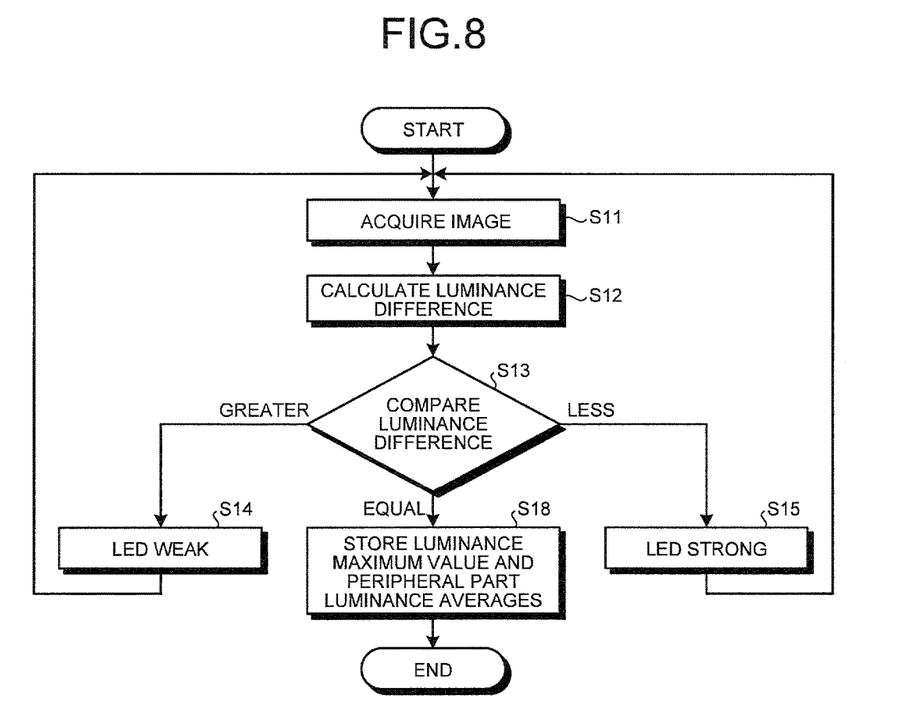
FIG. 8 is a flowchart illustrating an exemplary operation of luminance adjustment processing for infrared LEDs in an input controller according to a second embodiment.

FIG. 8 is a flowchart illustrating an exemplary operation of luminance adjustment processing of infrared LEDs in the input controller according to the second embodiment. The luminance adjustment processing of the infrared to be radiated from the infrared LED unit 11 in the input controller 10 according to the present embodiment will be described referring to FIGS. 4 and 8, by focusing on differences from the first embodiment. Steps S11, S14, and S15 in the luminance adjustment processing illustrated in FIG. 8 are respectively similar to steps S11, S14, and S15 in the luminance adjustment processing illustrated in FIG. 3 according to the first embodiment.

Step S12

The luminance calculating part 141 calculates the irradiated part luminance average (fourth luminance) which is the luminance average in the irradiated region sample area 202 (first area) in the captured image 201 which is the received image illustrated in FIG. 4. The irradiated region sample area 202 is the predetermined area included in the irradiated region 251 which is the area of the infrared radiated from the infrared LED unit 11 to the roof. In addition, the luminance calculating part 141 calculates the luminance averages (hereinafter referred to as peripheral part luminance averages) of the respective peripheral part sample areas 203*a* to 203*d* (second area) which are the predetermined areas outside the irradiated region 251 in the captured image 201. The luminance calculating part 141 extracts the peripheral part luminance maximum average (fifth luminance) which is the maximum average from the luminance averages calculated in the respective peripheral part sample areas 203*a* to 203*d*. In this case, the luminance is high in the irradiated region sample area 202, which is within the irradiated region 251 and irradiated with the infrared. On the other hand, the luminance is low in the peripheral part sample areas 203*a* to 203*d*, which are outside the irradiated region 251 and not irradiated with the infrared. Then, the luminance calculating part 141 calculates the luminance difference, which is the difference between the irradiated part luminance average and the peripheral part luminance maximum average. Then, the process proceeds to step S13. When the peripheral part sample areas 203*a* to 203*d* are referred to without being distinguished from each other, or referred to collectively, they will be simply referred to as peripheral part sample area 203.

The luminance averages are calculated in the plurality of sample areas such as the peripheral part sample areas 203*a* to 203*d* illustrated in FIG. 4, whereby the peripheral part luminance maximum average can be calculated to include a lot of luminance information in the area outside the irradiated region 251. Therefore, the luminance calculating part 141 can accurately calculate the luminance difference, which is the difference between the irradiated part luminance average and the peripheral part luminance maximum average.

Step S13

The LED control part 142 compares the luminance difference with a predetermined target value. As the result of the comparison by the LED control part 142 between the luminance difference and the target value, if the luminance difference is greater than the target value (step S13: GREATER), the process proceeds to step S14. If the luminance difference is less than the target value (step S13: LESS), the process proceeds to step S15. If the luminance difference is equal to the target value (step S13: EQUAL), the process proceeds to step S18.

The LED control part 142 performs the comparison between the luminance difference and the predetermined target value. In this regard, a determination as to whether the luminance difference is the predetermined target value is a concept including a determination as to whether the luminance difference is within a predetermined target range. In this case, if the luminance difference is greater than the predetermined target range, the process may proceed to step S14. If the luminance difference is less than the predetermined target range, the process may proceed to step S15. If the luminance difference is within the predetermined target range, the process may proceed to step S18.

Step S18

In a case where the luminance difference is equal to the predetermined target value, the LED control part 142 maintains the current irradiation intensity of the infrared radiated from the infrared LED unit 11. The luminance calculating part 141 then obtains the luminance maximum value (first luminance) of the irradiated region sample area 202, and stores the luminance maximum value in the storage part 146. Furthermore, when the luminance difference is equal to the predetermined target value, the ZED control part 142 stores, in the storage part 146, the peripheral part luminance averages (second luminance) of the respective peripheral part sample areas 203*a* to 203*d* calculated in step S12 by the luminance calculating part 141. The peripheral part luminance averages stored in the storage part 146 shall be referred to as "reference luminance averages".

The luminance adjustment processing is performed in the above-described way. The luminance adjustment processing is only required to be performed as an initial operation when starting the operation input system 1, and after that performed every predetermined time.

Gesture Operation Recognition Processing

Figure 9:
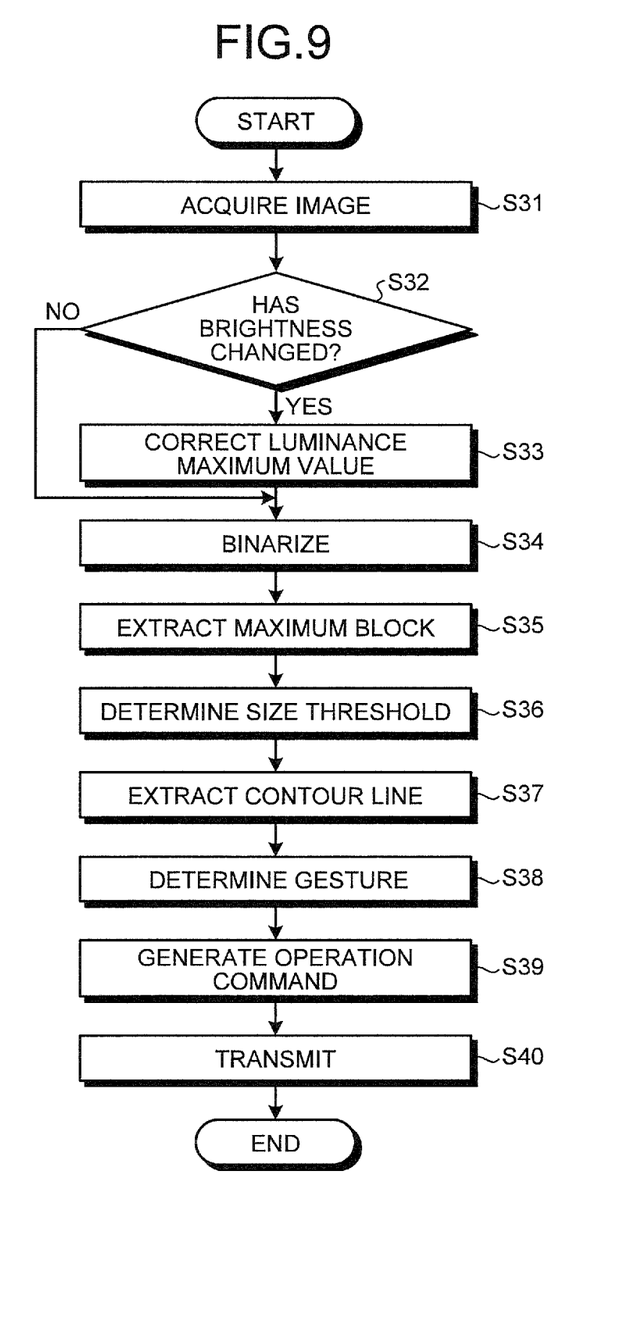
FIG. 9 is a flowchart illustrating an exemplary operation of gesture operation recognition processing in the input controller according to the second embodiment.

FIG. 9 is a flowchart illustrating an exemplary operation of gesture operation recognition processing in the input controller according to the second embodiment. The gesture operation recognition processing in the input controller 10 according to the present embodiment will be described referring to FIGS. 6, 7, and 9, by focusing on differences from the first embodiment. Steps S34 to S40 in the gesture operation recognition processing illustrated in FIG. 9 are respectively similar to steps S34 to S40 in the gesture operation recognition processing illustrated in FIG. 5 according to the first embodiment.

Step S31

The camera unit 12 captures the image in the capturing direction toward the roof of the automobile, and transmits the image to the luminance calculating part 141 of the control unit 14. Then, the process proceeds to step S32.

Step S32

The luminance calculating part 141 calculates the peripheral part luminance averages (third luminance) of the respective peripheral part sample areas 203*a* to 203*d* in the captured image 201 which is the received image (refer to FIG. 4). The luminance calculating part 141 also calculates, in each peripheral part sample area 203, an absolute value of the difference between the calculated peripheral part luminance average and the reference luminance average stored in the storage part 146. Then, the luminance calculating part 141 determines whether each calculated absolute value is equal to or greater than a predetermined value. If all of the absolute values corresponding to the peripheral part sample area 203 are equal to or greater than the predetermined value, the luminance calculating part 141 determines that a brightness of an external environment has changed since, for example, the automobile equipped with the operation input system 1 has entered a tunnel. Thus, the process proceeds to step S33. On the other hand, if at least one of the absolute values corresponding to the peripheral part sample area 203 is less than the predetermined value, the luminance calculating part 141 determines that the brightness of the external environment has not changed. Thus, the process proceeds to step S34.

Step S33

The luminance calculating part 141 calculates an average of the differences between the peripheral part luminance averages and the reference luminance averages in the peripheral part sample areas 203. This average is regarded as a luminance correction value. The luminance calculating part 141 corrects the luminance maximum value stored in the storage part 146 by adding the luminance correction value thereto, whereby the luminance maximum value stored in the storage part 146 is updated to the corrected luminance maximum value. Then, the process proceeds to step S34.

An example will be described below in which the reference luminance averages of the respective peripheral part sample areas 203*a* to 203*d* are "120", "123", "124", and "125". First, assuming that when the brightness of the external environment becomes dark, the peripheral part luminance averages of the respective peripheral part sample areas 203*a* to 203*d* are calculated to be, for example, "92", "93", "94", and "93" by the luminance calculating part 141. In this case, the absolute values of the differences between the peripheral part luminance averages and the reference luminance averages of the respective peripheral part sample areas 203 calculated by the luminance calculating part 141 are "28", "30", "30", and "32". Assuming that the predetermined value to be compared with is "10", all of the absolute values are equal to or greater than the predetermined value. Therefore, the luminance calculating part 141 determines that the brightness of the external environment has changed. In this case, the differences between the peripheral part luminance averages and the reference luminance averages of the respective peripheral part sample areas 203 calculated by the luminance calculating part 141 are "−28", "−30", "−30", and "−32". The luminance calculating part 141 then calculates the average of these differences, namely "−30", which is regarded as the luminance correction value. Assuming that the luminance maximum value stored in the storage part 146 is, for example, "135", the luminance calculating part 141 corrects the luminance maximum value "135" by adding the luminance correction value "−30" thereto so as to obtain the corrected luminance maximum value "105".

On the other hand, assuming that when the brightness of the external environment becomes light, the peripheral part luminance averages of the respective peripheral part sample areas 203*a* to 203*d* are calculated to be, for example, "137", "141", "143", and "143" by the luminance calculating part 141. In this case, the absolute values of the differences between the peripheral part luminance averages and the reference luminance averages of the respective peripheral part sample areas 203 calculated by the luminance calculating part 141 are "17", "18", "19", and "18". Assuming that the predetermined value to be compared with is "10" as described above, all of the absolute values are equal to or greater than the predetermined value. Therefore, the luminance calculating part 141 determines that the brightness of the external environment has changed. In this case, the differences between the peripheral part luminance averages and the reference luminance averages of the respective peripheral part sample areas 203 calculated by the luminance calculating part 141 are "17", "18", "19", and "18". The luminance calculating part 141 then calculates the average of these differences, namely "18", which is regarded as the luminance correction value. Assuming that the luminance maximum value stored in the storage part 146 is, for example, "135" as described above, the luminance calculating part 141 corrects the luminance maximum value "135" by adding the luminance correction value "18" thereto so as to obtain the corrected luminance maximum value "153".

In step S32, the luminance calculating part 141 is configured to determine that the brightness of the external environment has changed when all the absolute values corresponding to the peripheral part sample areas 203 are equal to or greater than the predetermined value. However, the determination criterion is not limited to this example. For example, the luminance calculating part 141 may be configured to determine that the brightness of the external environment has changed when the absolute values corresponding to a half or more of a plurality of peripheral part sample areas 203 are equal to or greater than the predetermined value. In this case, in step S33, the luminance calculating part 141 may calculate the average of the differences, the absolute values of which are equal to or greater than the predetermined value, between the peripheral part luminance averages and the reference luminance averages corresponding to the peripheral part sample area 203. Then, this average may be regarded as the luminance correction value.

In step S33, the luminance calculating part 141 calculates the average of the differences between the peripheral part luminance averages and the reference luminance averages in the respective peripheral part sample areas 203, and this average is regarded as the luminance correction value. However, the luminance correction value is not limited to this example. For example, the luminance calculating part 141 may regard, as the luminance correction value, a maximum value or a minimum value of the differences between the peripheral part luminance averages and the reference luminance averages in the respective peripheral part sample areas 203. Alternatively, the luminance calculating part 141 may regard, as the luminance correction value, a value obtained by multiplying the average, the maximum value, or the minimum value of the differences, by a predetermined coefficient. Still alternatively, the luminance calculating part 141 may regard, as the luminance correction value, a value obtained by adding a predetermined value to the average, the maximum value, or the minimum value of the differences.

The above-mentioned gesture operation recognition processing shall be performed repeatedly. By performing the above-mentioned gesture operation recognition processing, the car navigation device 20, which is the device to be operated, can be operated by the gesture of the driver.

As mentioned above, the input controller 10 stores, in the luminance adjustment processing, the peripheral part luminance averages of the respective peripheral part sample areas 203 as the reference luminance averages. In addition, the input controller 10 determines, in the gesture operation recognition processing, whether the brightness of the external environment has changed based on the absolute values of the differences between the peripheral part luminance averages and the reference luminance averages. Furthermore, when the brightness of the external environment is determined to have changed, the input controller 10 calculates the luminance correction value based on the differences between the peripheral part luminance averages and the reference luminance averages. The input controller 10 then corrects the luminance maximum value in accordance with the luminance correction value. As a result, in a case where the brightness of the external environment has changed when, for example, the automobile enters or leaves the tunnel, the luminance maximum value is corrected so that the gesture is detected based on the corrected luminance maximum value. Therefore, the influence of the disturbance can be suppressed and the gesture detection accuracy can be improved.

The input controller 10 according to the present embodiment exerts effects similar to those of the input controller 10 according to the first embodiment.

In step S12 illustrated in FIG. 8 and step S32 illustrated in FIG. 9, the luminance averages of the respective peripheral part sample areas 203 are calculated as the peripheral part luminance averages. However, the peripheral part luminance averages are not limited to this example. For example, maximum values or minimum values of the luminance of each peripheral part sample area 203 may be calculated.

In addition, in step S18 illustrated in FIG. 8, the luminance maximum value which is the maximum value of the luminance of the irradiated region sample area 202 is obtained. In step S33 illustrated in FIG. 9, the luminance maximum value is corrected by the luminance correction value, and in step S34, the luminance maximum value is used as the reference value of the image processing (binarizing) of the captured image. However, the value to be corrected and the reference value of the image processing are not limited to this example. For example, in step S18, a luminance average of the irradiated region sample area 202 may be obtained. Alternatively, a value may be obtained by multiplying the luminance maximum value or the luminance average by a predetermined coefficient. Still alternatively, a value may be obtained by adding a predetermined value to the luminance maximum value or the luminance average. In this case, in step S33 illustrated in FIG. 9, the value obtained in step S18 may be corrected by the luminance correction value. In addition, in step S34, the value obtained in step S18 may be used as the reference value of the image processing of the captured image.

According to the present invention, an influence of a disturbance can be suppressed and a gesture detection accuracy can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An operation input device comprising:
    an infrared irradiation device configured to radiate infrared;
    a camera unit configured to detect the infrared to capture an image;
    a luminance calculating circuit configured to calculate, in a captured image which is the image captured by the camera unit, a luminance difference between a luminance of a first area irradiated with the infrared by the infrared irradiation device and a luminance of a plurality of second areas that are areas not irradiated with the infrared by the infrared irradiation device;
    an infrared control circuit configured to adjust an irradiation intensity of the infrared to be radiated from the infrared irradiation device so that the luminance difference calculated by the luminance calculating circuit becomes a predetermined target value;
    an image processing circuit configured to detect a shape of an indication object from the captured image;
    a determination circuit configured to determine an operation by the indication object from the shape detected by the image processing circuit; and
    a command circuit configured to make a device to be operated perform a function corresponding to the operation determined by the determination circuit.

2. The operation input device according to claim 1, further comprising a storage unit, wherein
    the luminance calculating circuit stores, in the storage unit, a luminance maximum value of the first area when the irradiation intensity is adjusted by the infrared control circuit to cause the luminance difference to become the predetermined target value, and
    the image processing circuit compares a pixel value of each pixel constituting the captured image with the luminance maximum value to generate a binary image, and detects the shape of the indication object from the binary image.

3. The operation input device according to claim 1, wherein the operation input device performs, at predetermined intervals, capture and generation of the captured image by the camera unit, calculation of the luminance difference by the luminance calculating circuit, and adjustment of the irradiation intensity by the infrared control circuit.

4. The operation input device according to claim 1, wherein the camera unit comprises an image sensor configured to detect at least the infrared, and an infrared transmission filter arranged on an incident side of the image sensor.

5. The operation input device according to claim 1, wherein the luminance calculating circuit calculates, as the luminance difference, a difference between a luminance average of the first area and a luminance average of the plurality of second areas.

6. The operation input device according to claim 1, wherein the infrared control circuit adjusts the irradiation intensity to cause the luminance difference to be within a predetermined target range.

7. The operation input device according to claim 1, further comprising a storage unit configured to store first luminance used for detecting the shape by the image processing circuit in the first area in the captured image when the irradiation intensity is adjusted by the infrared control circuit, and each second luminance of the plurality of second areas in the captured image, wherein the luminance calculating circuit obtains each third luminance of the plurality of second areas in the captured image captured by the camera unit, and in response to determining that an absolute value of a difference between the third luminance corresponding to at least any of the plurality of second areas and the second luminance is equal to or greater than a predetermined value, the luminance calculating circuit calculates a luminance correction value based on the difference, the luminance correction value calculated to correct the first luminance by the luminance correction value.

8. The operation input device according to claim 7, wherein in response to determining that the absolute value of the difference between the third luminance corresponding to all of the plurality of second areas and the second luminance is equal to or greater than the predetermined value, the luminance calculating circuit corrects the first luminance.

9. The operation input device according to claim 7, wherein
the luminance calculating circuit calculates a luminance difference between fourth luminance of the first area and fifth luminance of the plurality of second areas,
the infrared control circuit adjusts the irradiation intensity to cause the luminance difference to become a predetermined target value, and
the luminance calculating circuit stores, in the storage unit, the first luminance and the second luminance when the luminance difference becomes the predetermined target value.

10. The operation input device according to claim 7, wherein the first luminance is a luminance maximum value of the first area.

11. The operation input device according to claim 7, wherein the second luminance and the third luminance are a luminance average of the plurality of second areas.

12. The operation input device according to claim 7, wherein the image processing circuit compares a pixel value of each pixel constituting the captured image captured by the camera unit with the first luminance to generate a binary image, and detects the shape of the indication object from the binary image.

13. An operation input method comprising the steps of:
radiating infrared;
detecting infrared to capture an image;
calculating, in the image, a luminance difference between a first luminance of a first area irradiated with the infrared and a second luminance of a plurality of second areas that are areas not irradiated with the infrared;
adjusting an irradiation intensity of the infrared to be radiated so that the luminance difference becomes a predetermined target value;
detecting a shape of an indication object from the image;
determining an operation by the indication object from the shape; and
instructing a device to perform a function corresponding to the operation.

14. A program for causing a computer provided in an operation input device to perform:
a luminance calculating circuit configured to calculate, in a captured image which is an image in which infrared is detected and captured by a camera unit, a luminance difference between a first luminance of a first area irradiated with the infrared by an infrared irradiation device and a second luminance of a plurality of second areas that are not irradiated with the infrared by the infrared irradiation device;
an infrared control circuit configured to adjust an irradiation intensity of the infrared to be radiated from the infrared irradiation device to cause the luminance difference calculated by the luminance calculating circuit to become a predetermined target value;
an image processing circuit configured to detect a shape of an indication object from the captured image;
a determination circuit configured to determine an operation by the indication object from the shape detected by the image processing circuit; and
a command circuit configured to control a device to perform a function corresponding to the operation determined by the determination circuit.

* * * * *